Jan. 4, 1927.
A. S. REICHEL
1,613,126
MOTOR SHEARS
Filed Sept. 22, 1925   2 Sheets-Sheet 2
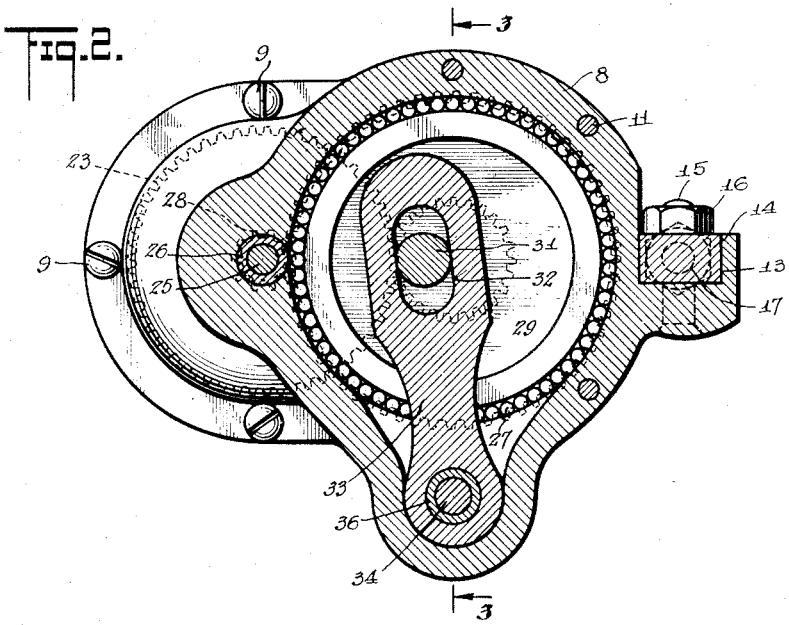
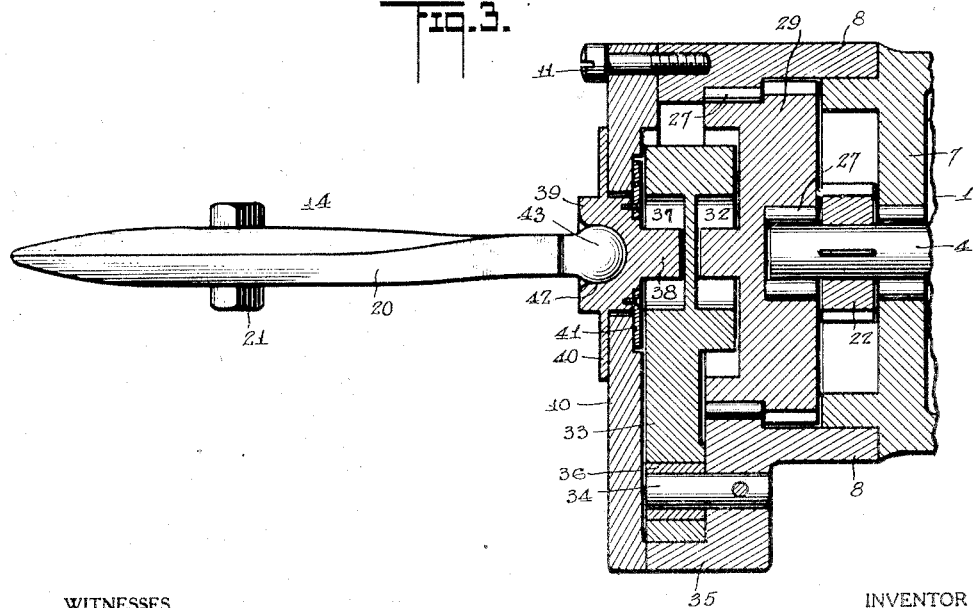
WITNESSES
INVENTOR
Alvin S. Reichel,
BY
ATTORNEYS Patented Jan. 4, 1927.

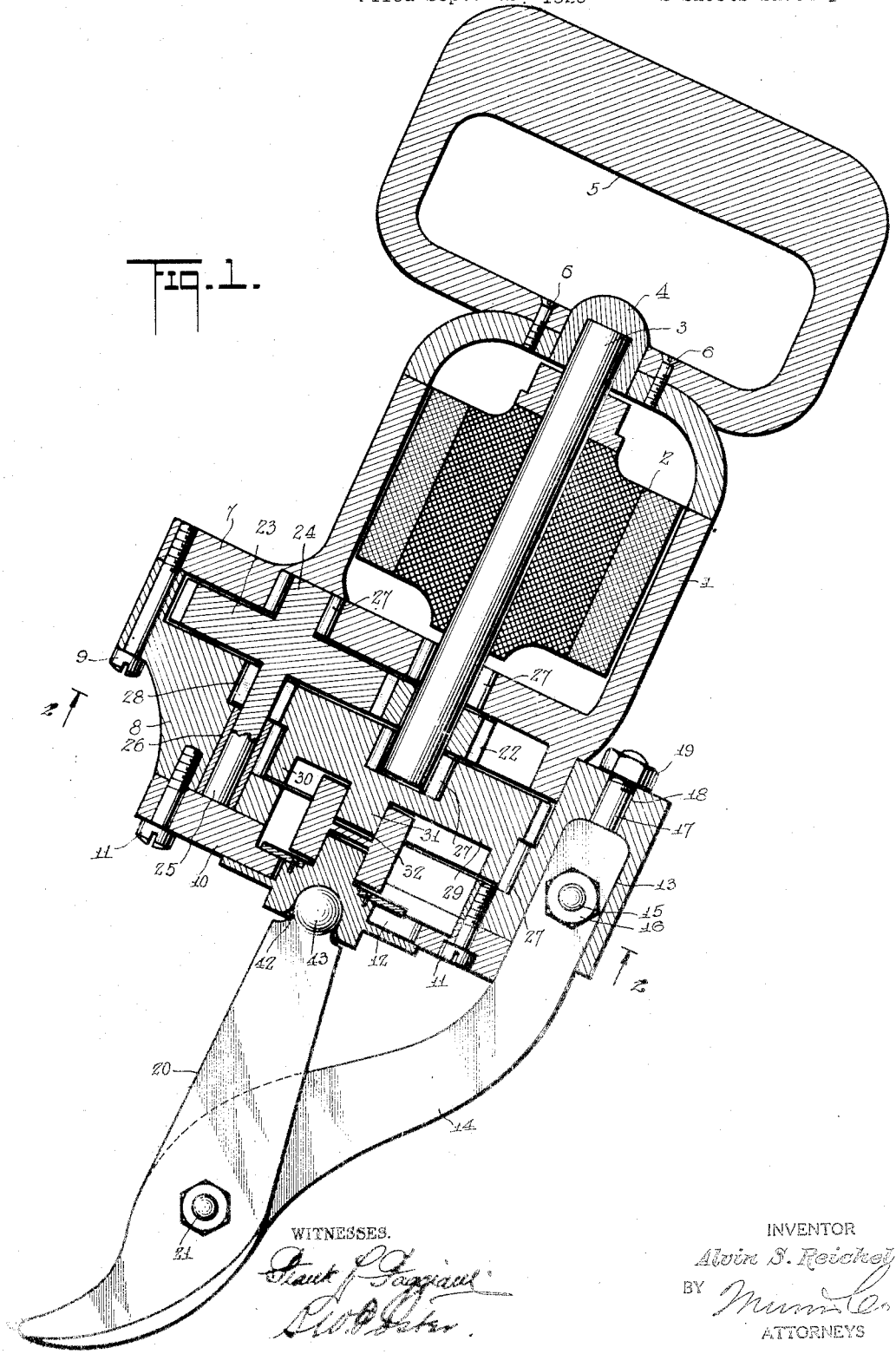

1,613,126

UNITED STATES PATENT OFFICE.

ALVIN S. REICHEL, OF NEW YORK, N. Y., ASSIGNOR OF ONE-THIRD TO PHILIP B. SMITH, OF BROOKLYN, NEW YORK.

MOTOR SHEARS.

Application filed September 22, 1925. Serial No. 57,919. REISSUED

This invention relates to motor shears, an object of the invention being to provide shears, having improved gearing and power transmitting means to the movable blade of the shears, which result in a maximum of power and efficiency.

A further object is to provide shears, the motor for driving the same constituting a part of the shears so that the device is entirely portable and may be conveniently moved and operated under any conditions.

A further object is to provide shears of the character stated which are operated by an electric motor and which give the maximum of efficiency with a minimum of weight and power utilized.

With these and other objects in view, the invention consists in certain novel features of construction and combinations and arrangements of parts, which will be more fully hereinafter described and pointed out in the claims.

In the accompanying drawings—

Figure 1 is a view in longitudinal section through my improved shears;

Figure 2 is a view in transverse section on the line 2—2 of Figure 1;

Figure 3 is a fragmentary view in longitudinal section taken on the line 3—3 of Figure 2.

1 represents a motor casing in which an electric motor 2 is located and functions to drive a shaft 3. This shaft 3 has a thrust bearing in a socket member 4 in one end of the casing 1, and a handle 5 is secured to the motor casing preferably by screws 6, as shown.

The end of the motor casing 1 opposite to the end to which the handle is secured is formed with a plate 7 to which a gear casing 8 is removably secured by screws 9. A covering plate 10 for the gear casing 8 is removably secured to the outer end of said gear casing by screws 11, and this covering plate 10 has a slot 12 therein for a purpose which will hereinafter appear.

The gear casing 8 is formed with a recess 13 receiving one end of a fixed shear blade 14, said blade being secured in the recess by a bolt 15 extending through the gear casing 8 and secured by a nut 16.

The blade 14 is also formed with an integral stud 17 which is projected through an opening 18 in the end wall of the recess 13, and a nut 19 is screwed onto this stud so that by reason of the construction above described, as indicated by Figures 1 and 2, the blade 14 will be rigidly fixed but is capable of removal as occasion may require.

20 represents the movable blade of the shears which is operated by my improved arrangement of gearing to be hereinafter described, and said blades 20 and 14 are pivotally connected by a bolt or rivet 21, as clearly shown.

The motor shaft 3 projects through the end of gear casing 8 and has a pinion 22 keyed thereon. This pinion 22 meshes with a larger gear wheel 23, and said gear wheel 23 is shown as having integral trunnions 24 and 25, although it is to be clearly understood that these parts may be separate and fixedly connected in any approved manner, but for purposes of description we will refer to them as trunnions 24 and 25.

The trunnion 24 is supported in the plate 7, and the trunnion 25 is supported in a bushing 26 located in the housing 8. Antifriction bearings are employed wherever possible, and I have illustrated roller bearings 27 throughout the mounting of the several shafts and gears to reduce friction to a minimum.

A pinion 28 is fixed to the trunnion 25 and meshes with a gear wheel 29 having a loose bearing on the end of the drive shaft 3, and also having a cylindrical extension 30 having a bearing within the housing 8, suitable roller bearings 27 being interposed between the extension 30 and the wall of the housing 8 so as to reduce friction to a minimum.

A crank pin 31 is fixed to gear wheel 29 and projects into a recess 32 in one side of a rocker arm 33. This rocker arm 33 is pivotally supported at one end by a pin 34 secured in a lateral extension 35 of gear casing 8, with a bushing 36 preferably located around the pin to sustain wear of movement of the rocker arm.

This rocker arm 33 is provided in its outer face with a recess 37 which is located in alinement with the recess 32 and receives a stud 38 on a socket member 39. This socket member 39 has a covering plate 40 which engages the outer face of the plate 10 to normally cover the slot 12 in which the socket member is movable, and a removable covering plate 41 is secured to the socket member 39 and engages the inner face of plate 10 to cover the slot 12. This socket member 39 has a socket 42 receiving a pawl or other similar enlargement 43 on the end of the movable shear member 20.

It is of course to be understood that any suitable electric switch may be provided on the shears within easy reach of the operator so that he can open and close the electric circuit to the motor 2 at will.

The operation is as follows:

When the motor 2 is started motion is transmitted as follows: Motor shaft 3 drives the pinion 22 and through the medium of gear 23, pinion 28 and gear 29 with the crank pin 31 thereon rocking motion or oscillating motion is imparted to the rocker arm 33, and this rocker arm 33 imparts rocking motion to the socket member 39 with which the blade 20 is coupled, so that this blade 20 is caused to move on its pivot 21.

The construction above described gives great power to the shears and the mechanism occupies but a relatively small space. Hence I am enabled to cut relatively thick sheet metal and can manipulate the shears so as to cut in any direction from almost any angle.

Various slight changes and alterations might be made in the general form of the parts described without departing from my invention, and hence I do not limit myself to the precise details set forth but consider myself at liberty to make such slight changes and alterations as fairly fall within the spirit and scope of the appended claims.

I claim:

1. A device of the character described, including a gear casing, a power shaft projecting into the gear casing, a fixed shear blade, a movable shear blade, a rocker arm mounted in the casing, a socket member operatively engaging the rocker arm and movably connected to the movable shear blade, a gear wheel located in axial alinement with the drive shaft, a crank pin on the gear wheel operatively connected to the rocker arm, and a gear train transmitting motion from the power shaft to the said last-mentioned gear.

2. A device of the character described, including a motor casing, a handle fixed to one end of the casing, a gear casing fixed to the other end of the motor casing, a rocker arm pivotally mounted in the gear casing and having longitudinal recesses in opposite sides thereof, a covering plate secured to the gear casing and having a guide slot therein, a socket member movable in said slot, plates on the socket member covering the slot, a shear blade fixed to the casing, a movable shear blade operatively connected to the socket member, a gear wheel in the casing, a crank pin on the casing engaging in one of the grooves in the rocker arm, a motor shaft projecting into the gear casing, and a gear train connecting the shaft with the first-mentioned gear wheel.

ALVIN S. REICHEL.